United States Patent

Sia

[15] 3,636,368

[45] Jan. 18, 1972

[54] TRANSFER SWITCH AND GENERATOR CONTROL MEANS, AND NEW AND IMPROVED METHOD OF OPERATION THEREOF

[72] Inventor: Joseph B. Sia, Yonkers, N.Y.

[73] Assignee: Onan Eastern Corporation, Long Island City, N.Y.

[22] Filed: June 29, 1970

[21] Appl. No.: 50,522

[52] U.S. Cl. ..................................................307/64
[51] Int. Cl. ..................................................H02j 9/00
[58] Field of Search......................307/66, 64, 85, 86, 87, 43

[56] References Cited

UNITED STATES PATENTS 3,337,742  8/1967  Baehr et al..............................307/64

*Primary Examiner*—Herman J. Hohauser
*Attorney*—James J. Romano, Jr.

[57] ABSTRACT

New and improved transfer switch and generator control means are provided and take the form of a substantially solid state electronic circuit which comprises operatively associated line voltage sensor means, circuit operating signal generating means, timer means to provide a readily adjustable time delay prior to retransfer to normal line voltage, timer means to provide a readily adjustable time delay prior to generator drive-engine shutdown, timer means to provide a readily adjustable time delay prior to generator drive-engine start, load transfer control means, retransfer to line voltage control means, readily adjustable generator output voltage sensor means and line voltage failure simulation test switch means, respectively.

The transfer switch and generator control means are operable, upon a fall in line voltage below a predetermined minimum level thereof, to energize emergency generator means after the expiration of an adjustable time delay and transfer the load thereto as soon as the output from said emergency generator means has come up to a predetermined minimum level thereof. Upon the return of the line voltage to said predetermined minimum level thereof, the transfer switch and generator control means are operable, following an adjustable time delay, to retransfer the load to said line voltage and, following another adjustable time delay, to deenergize said emergency generator means.

35 Claims, 2 Drawing Figures

FIG. 1B

INVENTOR
JOSEPH B. SIA

TRANSFER SWITCH AND GENERATOR CONTROL MEANS, AND NEW AND IMPROVED METHOD OF OPERATION THEREOF

BACKGROUND OF THE INVENTION

1. Field of the Invention

This invention relates to new and improved, automatic and highly reliable transfer switch and generator control means, and to the new and improved method of operation thereof.

2. Description of the Prior Art

Although a wide variety of transfer switch and generator control means are currently available for the energization of emergency generator means and transfer of the load thereto upon the failure of the line voltage, and the subsequent retransfer of said load to said line voltage upon the return thereof to "normal" with attendant subsequent shutdown of said emergency generator means, it may be understood that, in general, there are many significant problems and/or disadvantages inherent in the design and method of operation of all of such prior art transfer switch and generator control means.

More specifically, in many instances said prior art transfer switch and generator control means will be found to be inordinately costly and to be so large as to give rise to inordinate transfer switch and generator control means space requirements. As a result of the latter, it may be further understood that utilization of such prior art transfer switch and generator control means usually requires the disposition thereof, along with the included contactor means, at a location remote from the generator control panel to thus give rise to the need for extensive, heavy duty oversize cable therebetween with attendant high cable costs and not insubstantial voltage drops.

In addition, it may be understood that in many instances the transfer switch and generator control means of the prior art are decidedly lacking in sensitivity in that the same may be capable, for example, of sensing only a variation in line voltage of 5 percent or more. As a result, such prior transfer switch and generator control means will not be found to be particularly satisfactory for utilization in applications for emergency power generation means control in data processing and/or computer centers, or hospitals or the like, wherein the extremely sophisticated and sensitive nature of the electronic equipment being used is not compatible with a change in line voltage of this magnitude prior to emergency power generation energization.

Too, many of the prior transfer switch and generator control means of the invention will be found to be decidedly lacking in reliability since the same are not of total solid state construction, whereby such prior art transfer switch and generator control means are rendered generally unsuitable for use in demanding temperature, humidity and/or vibration environments.

Another major problem inherent in the design and manner of operation of the generator control means of the prior art resides in the fact that the same are totally lacking in versatility insofar as the change thereof from an application wherein the line voltage is of three-phase nature, to an application thereof wherein said line voltage is of single-phase nature, is concerned. This is to say that such change is rendered substantially impossible by the design and method of operation of such prior art transfer switch and generator control means without major modification thereof which can, in any event, rarely if ever be satisfactorily made in situ. A further significant disadvantage which arises as a result of this lack of versatility resides in the fact that the distributors of these single-application-limited prior art transfer switch and generator control means are accordingly required to stock an inordinately large supply thereof to insure that the demands for each of single and three-phase line voltage service can be quickly met.

It may also be understood that many of the prior art transfer switch and generator control means are of substantially unitary circuit configuration whereupon the satisfactory repair thereof upon malfunction in situ can become inordinately difficult and expensive due to the difficulties which arise under such conditions in the replacement of malfunctioning circuit components.

Further, and with regard to the timer means which are, of necessity, included in all transfer switch and generator control means of the nature under discussion, it may be understood that those of the prior art will be seen to rely on mechanical timer means in the nature of air diaphragm or motor-driven timer means to thus introduce a further aspect of unreliability as should be obvious.

Also, no prior art transfer switch and generator control means are currently known which provide for the precise and convenient adjustment of the generator output voltage sensor means to enable the precise setting of the generator output voltage threshold which must be reached before transfer of the load from the line voltage to the generator output voltage is enabled to occur.

Too, although some of the prior art transfer switch and generator control means do include test switch means to enable the testing thereof by line voltage failure simulation, none are currently known which enable the testing thereof through generator energization and operation in the "unloaded" condition as well as the "loaded" condition.

OBJECTS OF THE INVENTION

It is, accordingly, an object of this invention to provide new and improved, automatic transfer switch and generator control means, and the new and improved method of operation thereof.

Another object of this invention is the provision of transfer switch and generator control means as above which are of significantly reduced cost, and which present significantly reduced space requirements.

Another object of this invention is the provision of transfer switch and generator control means as above which are of substantially solid-state construction to thus provide for significant increase in transfer switch and generator control means accuracy of operation and reliability under all environmental conditions.

Another object of this invention is the provision of transfer switch and generator control means as above which are of significantly increased sensitivity to thus render the same particularly satisfactory for use in applications wherein a transfer to emergency power is warranted by even relatively small variations in the provided line voltage.

Another object of this invention is the provision of transfer switch and generator control means as above including voltage sensor adjustment means which provide for the precise and convenient adjustment of the generator output voltage threshold which must be reached before transfer to emergency power is effected.

Another object of this invention is the provision of transfer switch and generator control means as above which comprise a plurality of circuit components, each of which is fabricated in the form of a readily replaceable circuit card or circuit module, whereby the cost and difficulty of transfer switch and generator control means maintenance in situ are significantly reduced.

Another object of this invention is the provision of transfer switch and generator control means as above which, as a result of the discussed circuit card or circuit module construction thereof, are of significantly increased versatility in that the modification thereof for use in single or three-phase line voltage applications requires substantially only the ready and convenient changing of the relevant voltage sensor means circuit component card or module.

A further object of this invention is the provision of transfer switch and generator control means as above which, due to the significantly reduced space requirements thereof, may most advantageously be mounted directly at the generator in the generator control panel to thus significantly reduce the lengths and costs of oversize cables required for transfer switch and generator control means installation, and eliminate the attendant problem of relatively high-voltage drops in such oversize cables.

A still further object of this invention is the provision of transfer switch and generator control means as above which include test switch means enabling the simulation of a power failure and the test operation of the generator in either the loaded or unloaded conditions thereof.

Another object of this invention is the provision of transfer switch and generator control means as above wherein the included timer means are of solid-state construction and are each precisely and conveniently adjustable as desired.

SUMMARY OF THE INVENTION

As disclosed herein, the new and improved transfer switch and generator control means of the invention, and the new and improved method of operation thereof, are applied by way of example for utilization with three-phase line voltage and emergency generator means which are, of course, operable to provide three-phase output power. The new and improved transfer switch and generator control means of the invention take the form of a substantially solid-state electronic circuit which comprises operatively associated line voltage sensor means, circuit-operating signal-generating means, timer means to provide a readily adjustable time delay prior to retransfer to normal line voltage, timer means to provide a readily adjustable time delay prior to generator drive-engine shutdown, timer means to provide a readily adjustable time delay prior to generator drive-engine start, load transfer control means, retransfer to line voltage control means, readily adjustable generator output voltage sensor means, and line voltage failure simulation test switch means, respectively. Battery means are provided to power various of the circuit components of the transfer switch generator and control means of the invention. Further included are contactor means which do not, per se, form any part of the invention, but which are, of course, operatively associated therewith.

In operation, each individual leg of the three-phase line voltage is sensed by the voltage sensor means which are operative to provide a bias voltage in response thereto to prevent operation of the circuit-operating signal-generating means for so long as each leg of said line voltage is at or above a predetermined minimum level. Upon a drop in any leg of said line voltage, or the entire line voltage, below said predetermined minimum level, said bias voltage is automatically reduced whereupon said circuit operating signal generating means are activated to initiate the operation of the timer means which provide the readily adjustable time delay prior to generator drive-engine start. Upon the expiration of this time delay, the generator drive-engine is started with attendant drive of the generator. As soon as the generator output voltage comes up to a predetermined percentage of full rated generator output voltage, this is sensed by the generator output voltage sensor means which are then effective to operate the trigger means to energize the load transfer control means. As this occurs, said load transfer control means will operate the contactor means to transfer the load from the line voltage to the generator output voltage.

Operation continues in this manner until such time as the line voltage returns to said predetermined minimum level thereof, whereupon the voltage provided to the circuit-operating signal-generating means reassumes its predetermined minimum level with resultant initiation of the operating cycle of the timer means which provide a readily adjustable time delay prior to retransfer to normal line voltage. As this time delay elapses, the retransfer to line voltage control means are effective to retransfer the load through the contactor from the generator output voltage to the now again satisfactory line voltage. Concomitantly, the timing cycle of the timer means which provide a readily adjustable time delay prior to generator drive-engine shutdown is initiated and, at the completion thereof, the generator drive-engine and the generator are shutdown.

Further included in the new and improved transfer switch and generator control means of the invention are test switch means which provide for the convenient simulation of a line voltage failure and the subsequent start as described of the generator, and said test switch means include means to enable such test running of the generator in either of the loaded or unloaded conditions thereof.

DESCRIPTION OF THE DRAWINGS

The above and other objects and advantages of this invention are believed made clear by the following detailed description thereof taken in conjunction with the accompanying drawings, wherein.

DETAILED DESCRIPTION OF THE INVENTION

Figure 1A:
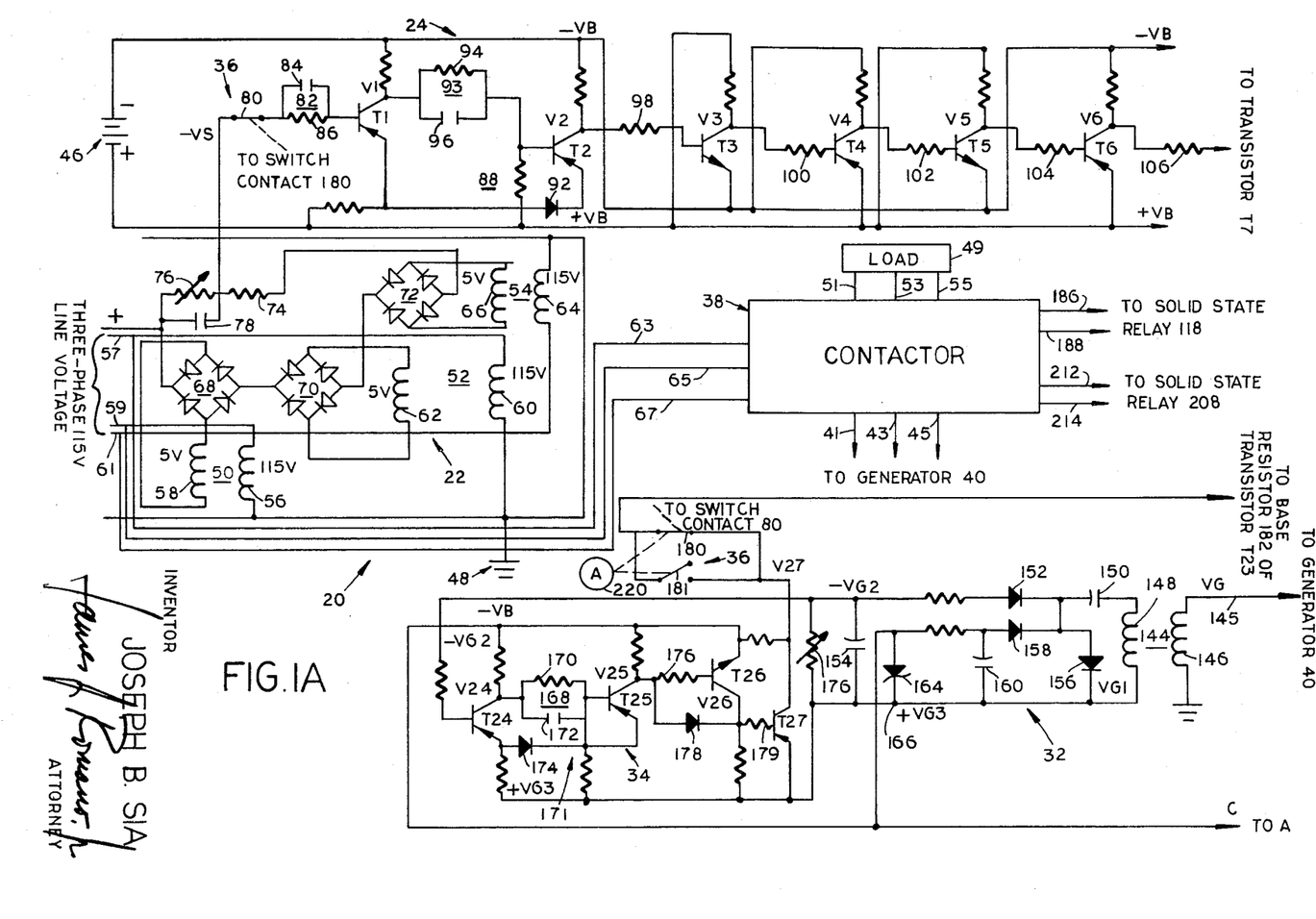
FIGS. 1A and 1B constitute a circuit diagram of new and improved transfer switch and generator control means constructed and operative in accordance with the teachings of this invention.
Figure 1B:
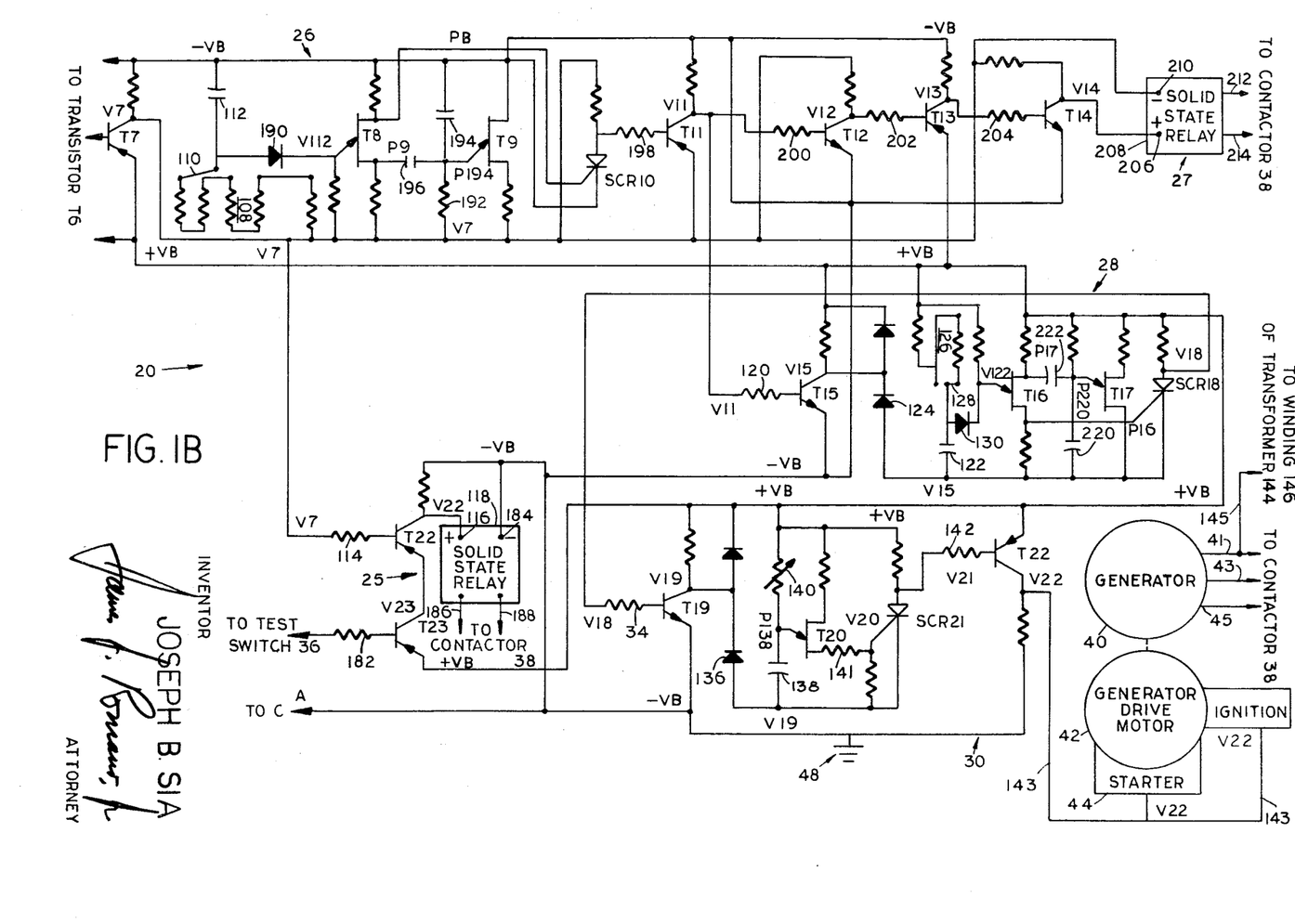

Referring now to FIGS. 1 and 1A, new and improved automatic, transfer switch and generator control means constructed and operative in accordance with the teachings of this invention are indicated generally at 20 and take the form of a substantially solid-state electronic circuit which comprises line voltage sensor means as generally indicated at 22, circuit operating signal generating means as indicated generally at 24, load transfer control means as indicated generally at 25, retransfer to line voltage control means as indicated generally at 27, timer means to provide a readily adjustable time delay prior to retransfer to normal line voltage as indicated generally at 26, timer means to provide a readily adjustable time delay prior to generator drive-engine shutdown as indicated generally at 28, timer means to provide a readily adjustable time delay prior to generator drive engine start as indicated generally at 30, generator output voltage sensor means as indicated generally at 32, trigger means as indicated generally at 34, and test switch means as indicated generally at 36. Further included are contactor means as indicated generally at 38. Said contactor means are preferably purchased as a unit and thus do not, per se, constitute a part of this invention.

Generator means which may, for example, take the form of an emergency generator as might normally be found in a hospital or large computer and/or data processing center, are indicated schematically at 40, and are driven as indicated from generator drive-engine means 42 which may, for example, take the form of a suitable internal combustion engine in the nature of a diesel engine, and include battery powered engine starter motor means as shown at 44 and engine ignition means as shown at 44'.

Battery means which may, for example, be of 12 v. rating, are indicated at 46 are operative, as described in greater detail hereinbelow, to provide positive and negative battery voltages as indicated at +VB and −VB, respectively, to power various of the circuit components of the new and improved transfer switch and generator control means 20 of the invention. A common ground for the circuit components of the invention is indicated at 48.

It is, of course, the function of the new and improved automatic, transfer switch and generator control means 20 of the invention to continuously sense the line voltage and, upon drop in the latter below a predetermined level and following the expiration of a predetermined time delay, to automatically start the generator drive motor 42 to drive the generator 40 and, after the latter has been brought up to speed and is providing at least a predetermined minimum of its rated output power, to transfer the load from said line voltage to the power then being provided by said generator means. It is the further function of the transfer switch and generator control means of the invention, upon the return of the line voltage to said predetermined level thereof, and again after the expiration of a predetermined time delay, to retransfer the load to said line voltage and to effect shutdown of the generator drive motor 42 and accordingly of the generator 40.

With this in view, and considering first a situation in which said line voltage is being supplied at the proper level thereof and is constituted, for example, by 115 v. three-phase power, it may be understood that this line voltage will be continuously applied as indicated to the sensor means 22. The sensor means 22 comprise stepdown transformers 50, 52 and 54 which are respectively operable to stepdown each leg of this line voltage to approximately 5 volts as indicated. More specifically, it may be seen that stepdown transformer 50 comprises a primary winding 56 and a secondary winding 58 across which one leg of said line voltage is stepped down, stepdown transformer 52 comprises a primary winding 60 and a secondary winding 62 across which another leg of said line voltage is stepped down, and stepdown transformer 54 comprises a primary winding 64 and a secondary winding 66 across which the third leg of said line voltage is stepped down, all as indicated to approximately 5 v.

Silicon controlled rectifier or SCR bridges are indicated at 68, 70 and 72 and are connected as shown in series. The respective approximately 5 volt transformer outputs are applied as indicated from the transformer secondary windings 58, 62 and 66 across the respective SCR bridges 68, 70 and 72 with resultant provision of an approximately 30 v. output from said series-connected SCR bridges.

A resistor 74 and an adjustable resistor 76 are provided as shown and are utilized in the manner of a potentiometer to reduce the bridge output voltage to substantially −6 v., while a capacitor 78 is provided to insure a substantially smooth −6 v. DC output from said sensor means 22. Of particular advantage as explained in greater detail hereinbelow, is the fact that the inclusion of the adjustable resistor 76 provides for a precise sensitivity adjustment by enabling the adjustment of the sensor output voltage which will result from a predetermined drop in the line voltage. More specifically, if any sensor means output voltage below −6 v. is to be effective to trigger the circuit-operating signal-generating means 24, appropriate adjustment of the adjustable resistor 76 will be effective to precisely determine just how far below the 115 v. level the line voltage must fall before said sensor means output voltage will fall below said −6 v. level to effect such triggering function.

The −6 v. output voltage from the sensor means 22 is applied from the negative side thereof as a negative voltage −VS as indicated through contact 80 of the test switch means 36, and the RC network 82 which comprises resistor 84 and capacitor 86, to the high-speed switch 88 of the circuit-operating signal-generating means 24. This high-speed switch or trigger circuit 88 comprises transistors T1 and T2 connected as shown in common emitter configuration having a diode 92 connected in the common emitter lead which is in turn connected as shown through a resistor 90 to the positive battery voltage +VB. The high-speed switch 88 is adjusted so that the same will be turned "off" only upon the application thereto from the sensor means 22 of an input voltage −VS which is at least −6 v. Accordingly, and with a bias voltage −VS of at least −6 v. applied as described to transistor T1, it may be understood that a positive voltage +V1 will appear at the collector of transistor T1 for application through RC network 93 to the base of transistor 92 and resultant appearance of a negative voltage −V2 in the collector of the latter. This will result, in the manner described in detail hereinbelow, in the appearance of a positive voltage +V7 at the collector of transistor T7 and the appearance of a positive voltage +V11 at the collector of T11. This positive voltage +V11 from the collector of transistor T11 will be applied as indicated through base resistor 120 to the base of transistor T15 of timer means 28, and this may be understood, again as described in detail hereinbelow, to result in a negative voltage −V15 at the collector of transistor T15 for application as a negative supply voltage to the SCR 18 of timer means 28 to turn the SCR 18 "on" and render the same conducting with attendant provision of a negative voltage −V18 as indicated to the transistor T19 of timer means 30 to prevent the initiation of the timing cycle of the latter, also as described in detail hereinbelow. Since, as described in detail hereinbelow, timer means 28 may, for example, be set to provide a 1 hour time delay, it may be understood that the provision of a positive voltage +V11 to said timer means for at least 1 hour to turn SCR 18 "on" may be required prior to normal use of the transfer switch and generator control means 20 of the invention.

Considering now for the purposes of operating description a situation wherein SCR 18 has been turned "on" as described and the line voltage subsequently falls below said predetermined satisfactory minimum level thereof as, for example, 100 v. As this occurs, it may be understood that the voltage −VS will fall, for example, from −6 v. to −5 v. The application as described of this −5 v. voltage −VS from the line voltage sensor means 22 to the base of T1 will be ineffective to turn T1 "on" whereupon a negative voltage −V1 will appear at the collector thereof for application through a voltage limiting RC network, which comprises resistor 94 and capacitor 96, to the base of transistor T2 with resultant provision of a positive voltage +V2 at the collector of T2. Thus the switch 88 will be "on."

This positive +V2 is applied through base resistor 98 to the base of transistor T3 with resultant appearance at the collector of the latter of a negative voltage −V3 for application through base resistor 100 to the base of transistor T4. This will result in the appearance of a positive voltage +V4 at the collector of transistor T4 for application through base resistor 102 to the base of transistor T5 with resultant appearance of a negative voltage −V5 at the collector of transistor T5 for application through base resistor 104 to the base of transistor T6. As a result, a positive voltage +V6 will appear at the collector of transistor T6 for application through base resistor 106 to the base of transistor T7 and attendant appearance of a negative circuit-operating voltage −V7 at the collector of the transistor T7.

This voltage −V7 will be applied as shown to the timer means 26 through the relevant portion of the timer means resistance network 108 and the timer means control switch 110 to the timer means capacitor 112. However, and since as described in greater detail hereinbelow, the negative battery voltage −VB is concomitantly applied to the other side of said timer means capacitor 112 from the battery 46, and since operation of said timer means 26 requires the full charging and subsequent discharging of the capacitor 112, it may be understood that this application of the negative voltage −V7 to said timer means capacitor as described will be ineffective to initiate the timing cycle of the timer means 26 at this point in time.

The negative voltage −V7 is also applied as indicated through base resistor 114 to the base of transistor T22. The transistor T22 is, however, unpowered or not turned "on" at this point in time because transistor T23 is "off" as described in detail hereinbelow whereby no power from the positive voltage +VB of the battery 46 is applied to the emitter of transistor T22. As a result, no positive voltage appears at the collector of T22 for application to the positive terminal 116 of the solid-state relay 118 with the results that said solid-state relay remains "open" and the transfer function thereof of the load to the generator 40 through the contactor means 38 is not performed at this time.

The fact that operation at this point in time of the timer means 26 will be prevented as described through the prevention of the charging of timer means capacitor 112 will, however result, again as described in detail hereinbelow, in the appearance of a negative voltage −V11 at the collector of transistor T11 and application thereof through resistor 120 to the base of transistor T15. Accordingly, a positive voltage +V15 will appear at the collector of the transistor T15. The application of this voltage +V15 to the capacitor 122 of the timer means 28 will, of course, be prevented by the diode 124, while it is believed clear that even if said positive voltage were applied to the relevant side of the capacitor 122, the same would be ineffective to charge said capacitor since the voltage +VB from the positive terminal of the battery 46 is also being applied to the other side of said capacitor through resistance network 126 and timer means control switch 128. As a result, the charging and discharging of the timer means capacitor 122 which is required for the operation of the timer means 28 as described in detail hereinbelow, will be prevented to thus prevent operation of said timer means at this point in time.

An immediate effect of the application of this now negative voltage −V11 to transistor T15 as described, and resultant appearance of the positive voltage +V15 at the collector of the latter, will however be the turning "off" of the SCR 18 by the removal of the power therefrom with the result that the positive battery voltage +VB which is applied as indicated through resistor 132 to said SCR, will be applied from the latter as a now positive voltage +V18 through base resistor 134 to the base of transistor T19 of timer means 30. This will result in the appearance of a negative voltage −V19 at the collector of the transistor T19 and the application thereof through the diode 136 as indicated to one side of the timer means capacitor 138. The positive battery voltage +VB is concomitantly applied as indicated through adjustable resistor 140 to the other side of the timer means capacitor 138 and it is believed clear that the said adjustable resistor may be utilized to precisely adjust the time which will be required for full charging and attendant discharge of said timer means capacitor.

Assuming the adjustable resistor 140 to be set to establish a 15 second charging period for the capacitor 138, it may be understood that after 15 seconds of the simultaneous application as described of the positive battery voltage +VB or +V18, and the negative voltage −V19, to opposite sides of the timer means capacitor 138, the latter will be fully charged to discharge and provide a voltage pulse P138 for application as indicated to the unijunction transistor T20 to turn the latter "on." As a result, a positive voltage +V20 will be applied from the base 1 of unijunction transistor T20 through resistor 140 to the SCR 21 to turn the latter "on" with resultant application of a negative voltage −V21 through base resistor 142 to the base of transistor T22.

The application as described of the negative voltage −V21 to transistor T22 will result in the provision of a positive generator drive-engine control voltage +V22 at the collector of said transistor for application as indicated to the generator drive motor starter 44 on line 143. This will, of course, result in the start of the generator drive motor 42 with resultant commencement of the drive of the generator 40, it being understood that said generator is, as yet, unconnected to the load. The 15 second time delay provided as described by the timer means 30 between the time that a drop of predetermined magnitude in the line voltage is sensed by the line voltage sensor means 22, and the time that the generator drive motor 42 is started to commence the drive of generator 40, will, or course, be effective to prevent repeated starting or "hunting" of said generator drive motor in response to fluctuations of short duration in said line voltage as may somewhat commonly occur during the course of the day in some areas.

Referring now to the generator output voltage sensor means 32, the same may be seen to include a stepdown transformer 114 which comprises a primary winding 146 and a secondary winding 148. If it is assumed that generator 40 is effective to provide 115 v., three-phase power VG at full rated output, it may be seen that one leg thereof is applied as indicated to the primary winding 146 of stepdown transformer 144 with resultant provision of a voltage VG1 of, for example, 12 v. in the transformer secondary winding 148. The voltage VG1 is applied through capacitor 150 for half-wave rectification by diode 152 and capacitor 154 to result in the provision as indicated of the negative voltage −VG2. This voltage −VG2 is then applied as indicated across adjustable resistor 176 to enable the precise adjustment in the level thereof to significant advantage as described in greater detail hereinbelow.

The same stepped-down generator voltage VG1 is also full wave rectified by diodes 156 and 158, filtered by capacitor 160, and applied as indicated across a load resistor 162, for application from the latter across a zener diode 164 for stabilization to result in the provision of a positive voltage +VG3 of substantially 12 v. at circuit junction point 166.

Referring now to the trigger means 34, the same may be seen to comprise a trigger circuit 171 which, in the manner of the high-speed switch or trigger circuit 88 as described in detail hereinabove, is constituted by transistors T24 and T25, RC network 168 which includes resistor 170 and capacitor 172, and diode 174 which are respectively operatively connected as shown. This trigger circuit 171 is not powered from the battery means 46, but rather, is powered by the positive voltage +VG from circuit junction point 166. More specifically, it may be seen that this positive voltage +VG3 is applied to the respective emitters of transistors T24 and T25 to perform this essential power supply function. Concomitantly, the negative voltage −VG2 is applied as indicated to the base of transistor T24 with the results that, if said negative voltage −VG2 is of sufficient level as discussed hereinbelow, the transistor T24 will be turned "on" and a positive voltage +V24 will appear at the collector thereof.

The provision of the adjustable resistor 176, and the application of the stepped-down and half-wave rectified generator output voltage −VG3 thereacross prior to the application of said voltage to the base of transistor T24 as described, enables the precise adjustment of the sensitivity of the generator output voltage sensor means 32 and the trigger means 34. More specifically, and bearing in mind that a voltage −VG2 of predetermined magnitude will be required to trigger the trigger circuit 171 of the trigger means 34, it may be understood that adjustment of the variable resistor 176 will be precisely effective to insure that the said negative voltage −VG2 does not assume said predetermined magnitude until such time as the output voltage VG from the generator has come up to a required percentage as, for example, 90 percent of rated generator output power.

The appearance as described of the positive voltage +V24 at the collector of T24 will result in the application thereof through the RC network 168, which includes resistor 170 and capacitor 172, to the base of transistor T25 with the resultant appearance of a negative voltage −V25 at the collector of transistor T25. This negative voltage −V25 will be applied as indicated through base resistor 176 to the base of transistor T26 to result in the appearance of a positive voltage +V26 at the collector of transistor T26. A diode 178 is connected as shown between the collector of transistor T25 and the collector of transistor T26 to provide for faster transistor switching action.

The positive voltage +V26 is applied as indicated from the collector of transistor T26 through base resistor 179 to the base of transistor T27, which is also powered as shown by the positive voltage +VG3, to result in the appearance of a negative voltage −V27 in the collector of transistor T27. This negative voltage −V27 is then applied as indicated through the normally closed contact 180 of the test switch means 36 and base resistor 182 to the base of transistor T23 to turn the latter "on" and result in the appearance of a positive voltage +V23 in the collector of transistor T23. The positive voltage +V23 is applied as indicated to the emitter of transistor T22 to power the latter and, in conjunction with the concomitant application of the negative voltage −V7 from the collector of transistor T7 to the base of transistor T22 through base resistor 114, will result in the appearance of a positive voltage +V22 at the collector of transistor T22 for application as indicated to the positive terminal 116 of the solid-state relay 118. The concomitant application of the negative voltage −VB from the battery 46 to the negative terminal 184 of the solid-state relay 118 will, of course, result in the "closing" of said solid-state relay at this point in time. As a result of the "closure" of solid-state relay 118, it may be understood that the same will be effective to operate the contactor 38 on lines 186 and 188 to transfer the load 49 from the line voltage which has been applied thereto as shown on lines 63, 65, and 67, through contactor 38, and on lines 51, 53 and 55, respectively, to the generator output voltage which is now applied thereto as indicated from the generator means 40 on lines 41, 43 and 45, through contactor 38, and lines 51, 53 and 55, respectively. Accordingly is believed made clear that the load 49 will now be powered from the generator means 40 rather than from said line voltage.

Operation in this manner will continue with the load 49 being powered as described by the output voltage VG of the generator means 40 until such time as the line voltage returns to at least said predetermined minimum level thereof as discussed hereinabove, whereupon the voltage −VS provided as described by the line voltage sensor means 22 to the transistor T1 of the high-speed switch 88 will again assume the −6 v. DC level thereof required to turn said transistor "on." As a result, a positive voltage +V1 will appear at the collector of transistor T1 for application as described through RC network 93 to the base of transistor T2 and attendant appearance of a negative voltage −V2 in the collector of the latter. As a result of this change from positive to negative in the output voltage from the high-speed switch 88, it may be understood that the voltage V7 which appears at the collector of the transistor T7 will also be changed from a negative voltage −V7 to a positive +V7.

This positive voltage +V7 is again applied as described through base resistor 114 to the base of transistor T22 with resultant change in the voltage V22 which appears at the collector of said transistor, and is applied as described to the terminal 116 of the solid-state relay 118, from a positive voltage +V22 to a negative voltage −V22. The method of operation of the solid-state relay 118 is, however, such that the same will remain "closed" to maintain the load 49 connected to the generator means 40 as described despite this change in polarity at said solid-state relay terminal.

This now positive voltage +V7 at the collector of transistor T7 will concomitantly be applied to timer means 26 through that portion of the resistance network 108 connected by timer means switch 110 to the positive side of the timer means capacitor 112 to commence the charging thereof, it being recalled that the negative battery voltage −VB is being concomitantly applied as indicated to the negative side of said capacitor. As depicted, the timer means switch 110 is a three-position switch, and it may be understood that the respective portions of the resistive network 108 which will be connected between the collector of transistor T7 and the timer means capacitor 112 with said switch in the respective positions thereof will be effective, for example, to provide for respective capacitor charging time of 15 minutes, 30 minutes and 1 hour. With the three-position switch 110 connected as shown it may further be understood that a 1 hour charging time will be provided for capacitor 112. A very low leakage diode 190 is provided as indicated to prevent any charging of the capacitor 112 by the positive battery voltage +VG to thus insure that the charging of said capacitor is accomplished solely in accordance with the voltage +V7 as applied thereto through the connected portion of resistive network 108 as determined by the setting of timer means switch 110.

Concomitantly with this charging of the timer means capacitor 112, the positive voltage +V7 is also applied through resistor 192 to repeatedly charge and discharge the relatively low capacitance capacitor 194 with the voltage +V7. Each time the capacitor 194 discharges, a pulse P194 will be applied as indicated to the emitter of unijunction transistor T9 with the resultant provision therefrom of a negative pulse −P9 for application as indicated through capacitor 196 to the base 2 of unijunction transistor T8. The application as described of the negative pulse −P9 to the base 2 of unijunction transistor T8 will cause the peak point voltage Vp of the latter to be reduced slightly whereby, once the voltage level across capacitor 112 becomes greater than this peak voltage Vp, the unijunction transistor T8 will trigger as described in detail directly hereinbelow. This is to say that the utilization as described of the unijunction transistor T9 in the manner of a pulse generator in the circuit of timer means 26 will substantially reduce the minimum peak current Ip required to trigger the unijunction transistor T9.

At the expiration of the 1 hour charging time of timer means capacitor 112, during which time the load 49 will remain connected to and powered from the generator means 40 as described despite the return of the line voltage to said predetermined minimum level thereof, the timer means capacitor 112 will discharge to provide a voltage V112, which exceeds the peak point voltage Vp of unijunction transistor T8 through diode 190 to provide the requisite peak current Ip to unijunction transistor T8 to trigger the latter with the resultant provision by said unijunction transistor of a positive-going pulse P8 as indicated to SCR 10 to gate the latter and render the same conducting. As a result, a negative voltage −V10 will be applied as indicated through base resistor 198 to the base of transistor T11, and a positive voltage +V11 will appear at the collector of transistor T11, it being understood that this transistor is now powered as indicated by the now positive voltage +V7 of transistor T7.

A particular advantage of the use as described of the unijunction transistor T9 in the manner of a pulse generator in the circuit of timer means 26 resides in the fact that the same provides for a particularly stable, long term triggering voltage for unijunction transistor T8. Thus, if as described in detail hereinbelow, the circuit card or module on which the circuit of timer means 26 is mounted, is changed, such change will not significantly change the voltage V7 which is required to trigger the unijunction transistor T8. Further, the use as described of unijunction transistor T9 to greatly reduce the peak current required by unijunction transistor T8 will, of course, enable the provision of significantly increased time capacity and range for the timer means 26. Too, a negative resistance characteristic is provided thereby in the circuit of timer means 26 with attendant low output impedance and high pulse current capability to significantly facilitate the requisite provision of the positive-going pulse P8 from the unijunction transistor T8 to the SCR 10 to trigger or gate the latter. In addition, the proven reliability of unijunction transistors through wide temperatures in the nature, for example, of −50° C. to +160° C., and the proven reliability thereof in demanding vibrational environments, as opposed, for example, to the relative unreliability of the much more fragile FET's or the like under the same demanding conditions, are, of course, of further obviously significant advantage.

The appearance of the positive voltage +V11 at the collector of transistor T11 will result in the application thereof through base resistor 200 to the base of transistor T12, with resultant appearance of a negative voltage −V12 at the collector of transistor T12 and the application thereof through base resistor 202 to the base of transistor T13. This will result in the appearance of a positive voltage +V13 at the collector of transistor T13 and the application thereof as indicated through base resistor 204 to the base of transistor T14 with the resultant appearance of a negative voltage −V14 at the collector of this latter transistor and the application thereof as indicated to the negative terminal 206 of the solid-state relay 208.

Concomitantly, the now positive voltage +V7 from the transistor T7 will be applied as indicated to the positive terminal 210 of the solid-state relay 208 with the result that the said relay will "close" to signal the contactor 38 on lines 212 and 214 to retransfer the load 49 from the generator means 40 to the line voltage as described. As a result, and although the generator means 40 will, at this point in time, continue to run and provide the three-phase 115 v. generator output voltage VG, it may be understood that no further load-powering use will be made of this generator output voltage during the cycle of transfer switch and generator control means operation under discussion.

Concomitantly with the application as described of the now positive voltage +V11 from transistor T11 to the base of transistor T12, it may be understood that said positive voltage +V11 will be applied as indicated through base resistor 120 to the base of transistor T15 of the timer means 28 which are effective as described hereinabove to provide a readily adjustable time delay prior to generator drive-engine shutdown.

Since the transistor T15 is powered as indicated by the negative battery voltage −VB, it may be understood that the application as described of the positive voltage +V11 to the base thereof will now result in the appearance of a negative voltage −V15 at the collector thereof with attendant passage of said negative voltage through diode 124 to commence the charging of timer means capacitor 122, it being understood that the positive battery voltage +VB is applied as indicated through resistance network 126 and two-position timer means switch 128 to the other side of the capacitor 122. The provision of the two-position switch means 128 and the resistance network 126 of course makes possible the precise adjustment in the amount of time which will be required for the charging of the timer means capacitor 122, and it may be understood that with said switch means in the depicted position thereof a capacitor charging time of, for example, approximately 1 hour may be provided. Conversely, with the switch means 128 in the other position thereof, it may be understood that a charging time for capacitor 122 of, for example, approximately one-half hour may be provided.

Concomitantly with the application as described of the negative voltage −V15 to the capacitor 122, it may be understood that the same will be applied as indicated to the negative side of the relatively low capacitance capacitor 220 to repeatedly charge and discharge the same. Each time the capacitor 220 discharges, a pulse P220 will be applied as indicated to the emitter of unijunction transistor T17 with the resultant provision therefrom of a negative pulse −P17 for application as indicated through capacitor 222 to the base 1 of the unijunction transistor T16. This will result, in the manner described hereinabove with regard to unijunction transistor T8 of timer means 26, in slight reduction in the peak point voltage Vp of unijunction transistor T16, and substantial reduction in the minimum peak current or Ip required to trigger the unijunction transistor T16, all to significant advantage as discussed hereinabove.

At the expiration of the approximately 1 hour charging period for timer means capacitor 122, it may be understood that the latter will discharge to provide the requisite peak current through diode 130 for triggering the unijunction transistor T16 and resultant provision of a positive-going pulse P16 therefrom as indicated to SCR 18 to gate the latter and render the same conductive. This will result in the provision of the negative voltage −V18 from the SCR 18, and this negative voltage −V18 will be applied as indicated through base resistor 134 to the base of transistor T19 of timer means 30 to in essence deactivate said timer means due to the resultant change in the collector voltage V19 from said transistor to a positive voltage +V19.

As a result, the generator drive-engine control voltage V22 which is applied as described on line 143 from the timer means 30 to the generator drive motor starter motor 44 and ignition system 44' will be changed from a positive control voltage to a negative control voltage −V22 with resultant shutdown of the generator drive motor 42 through deactivation of said generator drive motor starter ignition 44' and, as follows, of the generator 40, to thus fully complete the return to normal operating conditions under which the load 49 is powered as described from the now once again satisfactory 115 v., three-phase line voltage. SCR 18 will, of course, remain "on" and conducting to insure the maintenance of the negative voltage −V18 at the base of transistor T19 of the timer means 30 to prevent activation of said timer means with attendant generator drive-engine start until such time as the line voltage again falls below said predetermined minimum level thereof for at least 15 seconds. By this description is believed made clear that the timer means 28 will function to provide an approximately 1 hour time delay in generator drive motor shutdown during which the said generator drive motor will be driving an "unloaded" generator 40 and will thus be enabled to "cool" down gradually to thus significantly prolong the life and reliability thereof.

The powering of the load 49 as described through the contactor 38 by the 115 v., three-phase line voltage will, of course, continue until such time as said line voltage again falls below said predetermined minimum level thereof, at which time operation as described of the transfer switch and generator control means of the invention will again occur to commence the drive of the generator 40, and the connection of the load 49 thereto through the contactor 38 until the return of said line voltage to said predetermined minimum level thereof, whereupon the transfer switch and generator control means 20 of the invention will again function as described to retransfer said load to said line voltage and subsequently discontinue operation of the generator 40. Any initiation of the operating cycle of the transfer switch and generator control means 20 of the invention during those time periods when the line voltage is at or above said predetermined minimum level thereof will, of course, be prevented by the provision from the line voltage sensor means 22 of the negative voltage −VS of sufficient magnitude to the quick-acting switch 88 to maintain a positive voltage +V7 at the collector of transistor T7, and a positive collector voltage +V11 at transistor T11, to thus prevent operation as described of the timer means 30 to start the generator drive motor 42 and to concomitantly prevent the provision of the positive voltage +V22 at the collector of transistor T22 for application to the positive terminal 116 of the solid-state relay 118 with attendant maintenance of the latter in the "off" condition thereof and prevention of the transfer of the load 49 by the contactor 38 from said line voltage to the generator 40.

Referring now to the test switch means 36 which, as described, comprise the ganged switch contacts 80 and 180 and the normally open contacts 181, it may be understood that the same are effective to simulate a failure in the line voltage and effect the start of the generator drive motor 42 to commence the drive of generator 40 without actually requiring any transfer of the load to said generator or the initiation of the respective timing cycles of timer means 26 and 28; and are alternatively effective to accomplish a complete test of the transfer switch and generator control means of the invention in response to such line voltage failure simulation.

More specifically, and for an "unloaded" test of the generator means 40, the opening of the ganged switch contacts 80 and 180 of the test switch 36 will respectively completely remove the voltage −VS from the quick-acting switch 88 to thus have the same effect thereon as would a drop in the line voltage below said predetermined minimum thereof, and will prevent the application of −V27 to transistor T23. As a result of the former, the collector voltages from transistors T7 and T11 will be momentarily changed to negative voltages −V7 and −V11, respectively, with attendant initiation as described of the energization of timer means 30 and, following the provided 15 second time delay, the provision of a positive control voltage +V22 therefrom to the generator drive motor starter motor 44 to start the generator drive motor 42 and commence the drive of the generator 40 and the provision of the generator output voltage VG therefrom. However, and despite the fact that the generator means 40 will, if operating properly, soon come up to the percentage of the rated output power thereof which is required to trigger the trigger circuit 171 to provide the requisite negative voltage −V27 at the collector of transistor T27, it may be understood that the fact that both the switch contacts 180 and 181 are now open will prevent the application of this negative collector voltage −V27 to the base of transistor T23 which is required as described to effect the turning "on" of the solid-state relay 118 with attendant transfer of the load 49 from the line voltage to the output voltage VG of the generator 40. Accordingly is believed made clear that the utilization as described of the test switch 36 will enable the ready and convenient testing at any desired intervals of the generator starting function of the transfer switch and control means 20 of the invention without requiring the transfer of the load thereto.

A complete test of the transfer switch and generator control means 20 of the invention to include the transfer of the load 49 to the generator means 40 may, of course, be effected as should be obvious by the closure of the normally open test switch contacts 181 concomitantly with the opening of test switch contacts 80 and 180. Alarm means which may take visible and/or audible form are indicated at 220 and are operatively associated as shown with the test switch means 36 to clearly indicate any utilization of said test switch means.

Of course, as soon as the switch contacts 80 of the test switch 36 are reclosed, the voltage which appears at the collector of the transistor T7 will again be the positive voltage +V7 to thus return the control voltage V22 from timer means 30 to a negative voltage −V22 for application as described on line 143 to the generator drive motor ignition 29 to in essence "short-out" the same and stop said generator drive motor. Too, the closure of the switch contact 180 of the test switch 36 will, in any event, function to reconnect the collector of transistor T27 to the base of transistor T23 for obvious purpose.

Preferably, the respective line voltage sensor means 22, circuit operating signal generating means 24, timer means 26, 28 and 30, generator output voltage sensor means 32 and trigger means 34 of the transfer switch and control means of the invention are each fabricated as a separate circuit component card or as a separate circuit component module for ready and convenient replacement thereof on a suitably configured circuit mounting board in a manner believed well understood by those skilled in this art. A particular advantage of the fabrication of the line voltage sensor means 22 in the form of such circuit component card or module is the fact that the replacement thereof, for operation as described in instances wherein the line voltage is of single rather than three-phase, with line voltage sensor means specifically designed to sense single rather than three-phase line voltages, may be readily and conveniently effected without significant modification of the remainder of the transfer switch and generator control means components to significant advantage insofar as the versatility of the transfer switch and control means 20 of the invention are concerned. More specifically, a particularly significant advantage of this versatility insofar as the ready and convenient conversion of the transfer switch and generator control means 20 of the invention from three-phase to single-phase service, or vice versa, is concerned, resides in the fact that the same enables a transfer switch and generator control means distributor to stock a minimum number of the same while maintaining a somewhat larger stock of only the three-phase and single-phase line voltage sensor means circuit component cards.

A further advantage of the fabrication of the respective transfer switch and generator control means components in circuit component card or module form is believed the fact that despite the extremely high reliability which is inherent in the design and fabrication thereof, malfunction therein can, of course, still occur but, once traced to a particular circuit component card, can be readily and conveniently remedied in situ at minimum expense in time and money by the simple replacement of the malfunctioning circuit component card or module with another of the same design and manner of operation.

With more specific regard to the significant reduction in transfer switch and generator control means space requirements made possible by the teachings of this invention, it may be understood that the latter enable a reduction of at least 50 percent in such space requirements to thereby enable the most advantageous disposition as described of the transfer switch and generator control means circuit at the generator within the generator control panel. Too, and with more specific regard to the significant reduction in cost made possible by the teachings of this invention, it may be understood that the latter enable a reduction of approximately 30 percent in the cost of the specifically disclosed circuit components of the transfer switch and generator control means or, that is to say, the portion thereof which does not include the contactor means, and enable a reduction of approximately 10 percent to 15 percent in the overall cost of the transfer switch and generator control means as do include said contactor means.

While I have shown and described the preferred embodiment of my invention, it will be understood that the invention may be embodied otherwise than as herein specifically illustrated or described, and that certain changes in the form and arrangement of parts and in the specific manner of practicing the invention may be made without departing from the underlying idea or principles of this invention within the scope of the appended claims.

What is claimed is:

1. In automatic transfer switch and generator control means for maintaining the powering of a load in the event of line voltage failure which include means to automatically commence operation of a generator and transfer the load thereto upon a drop in said live voltage below a predetermined minimum level thereof, and means to retransfer the load to said line voltage and discontinue operation of said generator upon the return of said line voltage to said predetermined minimum level thereof, the improvements comprising, line voltage sensor means, means to apply said line voltage thereto, said line voltage sensor means being operable to provide an output voltage of predetermined level in response to a drop in said line voltage below said predetermined minimum level thereof, switch means responsive to said output voltage and operable to control the reenergization of said generator and the transfer of the load thereto, and means to apply said output voltage to said switch means to control the operation thereof.

2. Automatic transfer switch and generator control means as in claim 1 further comprising, means to adjust the level of said output voltage provided by said voltage sensor means in response to said line voltage to thereby enable the adjustment of the level of said line voltage which will be operable to provide said output voltage of predetermined level.

3. Automatic transfer switch and generator control means as in claim 2 wherein, said line voltage is of multiphase configuration, and said line voltage sensor means comprise means to sense each leg of said line voltage.

4. Automatic transfer switch and generator control means as in claim 3 wherein, said line voltage sensor means comprise a plurality of stepdown transformers, there being one transformer for each leg of said line voltage, means to respectively apply said line voltage legs to the primary windings of said transformers, and series-connected bridge circuits which are respectively connected to the transformer secondary windings to provide said line voltage sensor means output voltage.

5. Automatic transfer switch and generator control means as in claim 4 wherein, each of said bridge circuits is an SCR bridge circuit.

6. Automatic transfer switch and generator control means as in claim 2 wherein, said adjustment means comprise an adjustable resistor, and means to apply said line voltage sensor means output voltage to said adjustable resistor.

7. Automatic transfer switch and generator control means as in claim 5 wherein, said adjustment means comprise an adjustable resistor, and means to apply said line voltage sensor means output voltage from said series-connected SCR bridge circuits to said adjustable resistor.

8. In automatic transfer switch and generator control means as in claim 2 wherein, said means to sense line voltage and automatically commence operation of said generator and transfer the load thereto upon drop in said line voltage below a predetermined minimum level thereof comprise, line voltage sensor means operable to provide an output voltage of predetermined level in response to said line voltage being at said predetermined minimum level thereof, and operating signal generating means including said switch means which are operable in response to said line voltage sensor means output voltage of predetermined level to in turn provide an operating voltage signal, and which are further operable in response to a line voltage sensor means output voltage which is below said predetermined level to provide a different operating voltage signal.

9. Automatic transfer switch and generator control means as in claim 8 wherein, said switch means comprise fast-acting trigger circuit means which are turned "off" only when said line voltage sensor means output voltage is at or above said predetermined level thereof.

10. Automatic transfer switch and generator control means as in claim 9 wherein, said fast-acting trigger circuit means comprise first and second transistors connected in common emitter configuration, and means to apply said line voltage sensor means output voltage to the base of said first transistor.

11. Automatic transfer switch and generator control means as in claim 8 wherein, said means to sense line voltage and automatically commence operation of a generator and transfer the load thereto upon drop in said line voltage below a predetermined minimum level thereof comprise, generator energization control means, timer means operatively associated with said generator energization control means, and means to apply said operating voltage signals to said timer means, said timer means being effective in response to the application of said different operating voltage signal thereto to provide a predetermined time delay and, at the expiration thereof, to operate said generator energization control means to commence generator operation.

12. Automatic transfer switch and generator control means as in claim 11 wherein, said timer means comprise means to adjust the time delay provided thereby prior to generator energization.

13. Automatic transfer switch and generator control means as in claim 11 wherein, said timer means comprise a unijunction transistor which must be triggered prior to generator energization, and capacitor means operatively connected in the emitter circuit of said unijunction transistor and operable to delay the triggering of the latter until said capacitor means have been charged in response to said different operating voltage signal to discharge and provide the requisite unijunction transistor peak point voltage.

14. Automatic transfer switch and generator control means as in claim 13 wherein, said timer means comprise means to adjust the time delay provided thereby prior to generator energization.

15. Automatic transfer switch and generator control means as in claim 14 wherein, said means to adjust said time delay provided by said timer means comprise an adjustable resistor connected in series with said capacitor means and operable to adjust the charging time of the latter and to accordingly adjust said time delay.

16. Automatic transfer switch and generator control means as in claim 1 wherein, said means to sense line voltage and automatically commence operation of said generator and transfer the load thereto upon drop in said line voltage below said predetermined minimum level thereof further comprise, generator output voltage sensor means and operatively associated load transfer control means, said generator output voltage sensor means being operable to sense said generator output voltage and delay the operation of said transfer control means until such time as said generator output voltage has come up to a predetermined minimum level thereof.

17. Automatic transfer switch and generator control means as in claim 16 wherein, said generator output voltage sensor means comprise a stepdown transformer, means to apply said generator output voltage to the primary winding of said transformer to induce a control voltage in the secondary winding of said transformer, fast-acting trigger circuit means, means to apply said control voltage to said trigger circuit means, said trigger circuit means being turned "on" only when said control voltage assumes a predetermined minimum level thereof in response to said generator output voltage having come up to said predetermined minimum level thereof, and means connecting said fast-acting trigger circuit with said transfer control means in such manner that the latter will be operative to transfer the load to said generator output voltage only when said trigger circuit is turned "on."

18. Automatic transfer switch and generator control means as in claim 17 wherein, said generator output voltage sensor means comprise means to adjust the level of said control voltage provided in response to said generator output voltage to thereby enable the adjustment of the level of said generator output voltage which will be operative to provide said control voltage of predetermined minimum level.

19. Automatic transfer switch and generator control means as in claim 18 wherein, said control voltage adjustment means comprise an adjustable resistor, and means to apply the control voltage thereto prior to the application thereof to said trigger circuit.

20. Automatic transfer switch and generator control means as in claim 19 wherein, said fast-acting trigger circuit means comprise first and second transistors connected in common emitter configuration, and means to apply said control voltage to the base of said first transistor.

21. Automatic transfer switch and generator control means as in claim 17 wherein, said load transfer control means comprise solid-state relay means operatively associated with said fast-acting trigger circuit means and operable to be "closed" to effect load transfer only in response to the turning "on" of the latter.

22. Automatic transfer switch and generator control means as in claim 19 wherein, said load transfer control means comprise solid-state relay means operatively associated with said fast-acting trigger circuit means and operable to be "closed" to effect load transfer only in response to the turning "on" of the latter.

23. Automatic transfer switch and generator control means as in claim 8 wherein, said means to retransfer the load to said line voltage and discontinue operation of said generator upon the return of said line voltage to said predetermined minimum level thereof comprise, load retransfer control means, retransfer timer means operatively associated with said load retransfer control means, means to apply said operating voltage signals to said retransfer timer means, said retransfer timer means being effective in response to the application of said operating voltage signal thereto, attendant the return of said line voltage to said predetermined minimum level thereof, to provide a predetermined time delay and, at the expiration thereof, to provide a signal to operate said load retransfer control means to retransfer the load to said line voltage.

24. Automatic transfer switch and generator control means as in claim 17 wherein, said retransfer timer means comprise first and second unijunction transistors, said first unijunction transistor being effective to prevent operation of said load retransfer control means until the former is triggered, said second unijunction transistor being operable to be triggered in response to said operating voltage signal to apply pulses to a base of said first unijunction transistor to reduce the minimum peak current of the latter, and capacitor means operatively connected in the emitter circuit of said first unijunction transistor and operable to delay the triggering of the latter until said capacitor means have been charged in response to said operating voltage signal to discharge and provide the peak point voltage required to trigger said first unijunction transistor.

25. Automatic transfer switch and generator control means as in claim 23 wherein, said retransfer timer means further comprise means to adjust the time delay provided by said timer means.

26. Automatic transfer switch and generator control means as in claim 24 wherein, said retransfer timer means further comprise means to adjust the time delay provided by said timer means.

27. Automatic transfer switch and generator control means as in claim 26 wherein, said time delay adjustment means comprise variable resistance means connected in series with said capacitor means and operable to adjust the charging time of the latter and to accordingly adjust said time delay.

28. Automatic transfer switch and generator control means as in claim 23 wherein, said load retransfer control means comprise solid-state relay means operatively associated with said retransfer timer means and operable to be "closed" to effect load retransfer only in response to said signal from said retransfer timer means.

29. Automatic transfer switch and generator control means as in claim 27 wherein, said load retransfer control means comprise solid-state relay means operatively associated with said retransfer timer means and operable to be "closed" to effect load retransfer only in response to said signal from said retransfer timer means.

30. Automatic transfer switch and generator control means as in claim 11 wherein, said means to retransfer the load to said line voltage and discontinue operation of said generator upon the return of said line voltage to said predetermined minimum level thereof comprise, load retransfer control means, retransfer timer means operatively associated with said load retransfer control means, means to apply said operating voltage signals to said retransfer timer means, said retransfer timer means being effective in response to the application of said operating voltage signal thereto, attendant the return of said line voltage to said predetermined minimum level thereof, to provide a predetermined time delay and, at the expiration thereof, to provide a signal to operate said load retransfer control means to retransfer the load to said line voltage.

31. Automatic transfer switch and generator control means as in claim 30 wherein, said means to retransfer the load to said line voltage and discontinue operation of said generator upon the return of said line voltage to said predetermined minimum level thereof comprise, generator shutdown timer means operatively associated with said generator energization control means and with said retransfer timer means, means to apply said signal from said retransfer timer means to said generator shutdown timer means, said generator shutdown timer means being effective in response to the application of said signal thereto to provide a predetermined time delay and, at the expiration thereof, to operate said generator energization control means to discontinue operation of said generator.

32. Automatic transfer switch and generator control means as in claim 31 wherein, said generator shutdown timer means comprise first and second unijunction transistors, said first unijunction transistor being effective to prevent operation of said generator energization control means to discontinue operation of said generator until the same is triggered, said second unijunction transistor being operable in response to said signal from said retransfer timer means to be triggered to apply pulses to a base of said first unijunction transistor to reduce the minimum peak current of the latter, and capacitor means operatively connected in the emitter circuit of said first unijunction transistor and operable to delay the triggering thereof until said capacitor means have been charged in response to said retransfer timer means signal to discharge and provide the peak point voltage required for triggering of said first unijunction transistor.

33. Automatic transfer switch and generator control means as in claim 31 wherein, said generator shutdown timer means further comprise means to adjust the time delay provided thereby.

34. Automatic transfer switch and generator control means as in claim 32 wherein, said generator shutdown timer means further comprise means to adjust the time delay provided thereby.

35. Automatic transfer switch and generator control means as in claim 34 wherein, said time delay adjustment means comprise variable resistance means connected in series with said capacitor means and operable to adjust the charging time thereof and to accordingly adjust said time delay.

* * * * *